F. CHENEY.
SOUND BOX.
APPLICATION FILED FEB. 15, 1918.
1,339,809. Patented May 11, 1920.
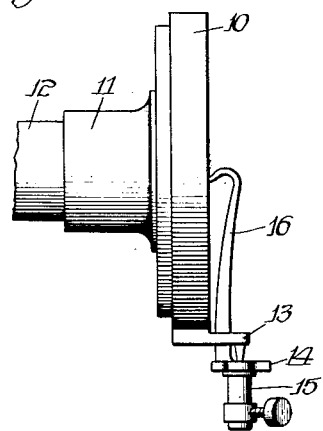
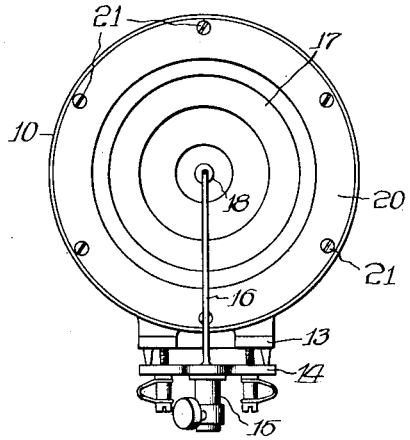
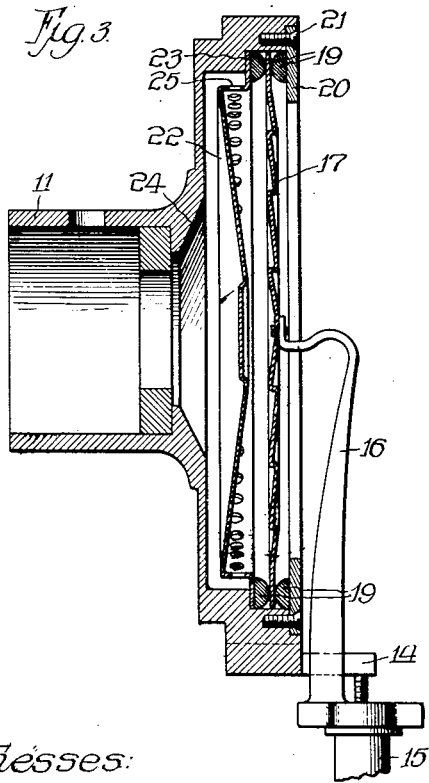
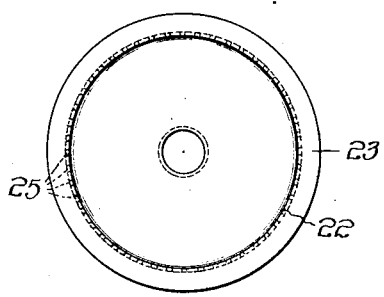
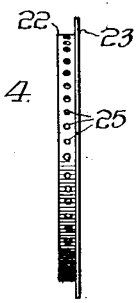
Inventor:
Forest Cheney.

UNITED STATES PATENT OFFICE.

FOREST CHENEY, OF CHICAGO, ILLINOIS, ASSIGNOR TO CHENEY TALKING MACHINE COMPANY, OF CHICAGO, ILLINOIS, A CORPORATION OF ILLINOIS.

SOUND-BOX.

1,339,809.

Specification of Letters Patent.   Patented May 11, 1920.

Application filed February 15, 1918.   Serial No. 217,317.

*To all whom it may concern:*

Be it known that I, FOREST CHENEY, a citizen of the United States, residing in the city of Chicago, county of Cook, and State of Illinois, have invented certain new and useful Improvements in Sound-Boxes, of which the following is a specification.

My invention relates to talking machines and particularly to a novel sound box therefor. The principal object of my invention is to provide a new and improved apparatus for recording or reproducing sound in connection with talking machines and the like.

Another object is to provide a sound recorder or reproducer that will operate to preserve the quality of the sound.

A further object is to provide a sound box for talking machines which will clarify the sound reproduced thereby.

Another object is to amplify sound by providing a plurality of air chambers within a sound box.

A still further object is to clarify the sound by providing a sound box with a partition wall to eliminate interferences of the sound waves.

A further object is to improve sound boxes for talking machines by providing an apertured partition through which the sound waves are directed radially with respect to the axis of the diaphragm.

A still further object is to provide a sound box having double air chambers, each of which increases in volume in the direction of the flow of the sound.

These and other objects will be apparent from an observation of the drawings, in which—

Figure 1 is a side elevation of a sound box made in accordance with my invention.

Fig. 2 is a plan view of the same looking from the right hand side of Fig. 1.

Fig. 3 is an enlarged vertical sectional view through the center of the sound box made in accordance with my invention.

Fig. 4 is an edgewise view of the preferred form of apertured partition, and

Fig. 5 is an elevation thereof.

In the drawings, 10 represents the usual sound box casing having a rearwardly extending portion 11 for connection to a tone arm 12 by any well known means such as a bayonet joint. The casing carries at its lower portion a bracket 13 which supports the usual carriers 14 having a breech 15 to receive the needle and connected to the arm 16 which is rigidly connected to the diaphragm 17 at its central point 18. The diaphragm 17 is securely retained in a casing 10 by means of the usual resilient washers 19 held in place by the annular binding member 20 fastened to the casing 10 by screws 21.

The diaphragm 17 which I have chosen to illustrate is corrugated in section and operates in the well known principle of diaphragms, whenever movement thereto is imparted through the needle and the arm 16 in the usual manner. Between the rear surface of the diaphragm 17 and the rear wall of the casing 10 I interpose a partition 22 which in the form shown, is preferably dished, the shallow portion being near the central point of the diaphragm 17 and immediately back of the connection 18 with the arm 16. The partition member is formed with axially and radially extending marginal portions which may be formed at the time the plate is dished. The radially extending flange members extend sufficiently to serve as a means for retaining the partition in position and preferably abut shoulders 23 in the casing 10. The axially extending marginal portions I prefer to provide with a plurality of regularly formed apertures the axes of which apertures are perpendicular to the horizontal axis of the tone arm and parallel to the plane of the diaphragm 17. As is usual practice the rear portion of the casing 10 is cut away at 24 to serve as a funnel for directing the sound waves of the partition 22. I have formed double air chambers within the casing behind the diaphragm, each chamber is of such a shape that the volume is increased in the direction of the flow of the sound waves. The diaphragm being vibrated through the needle and the arm 16 the vibrations thereby set up are directed against the partition 22 which is imperforate throughout its surface except in the marginal edges where the apertures 25 are formed. Thus the sound waves created by the diaphragm will be directed against the dished portion 22 and spread radially and be directed through the apertures 25. Because of the provision of a plurality of small apertures the sound waves will be distributed uniformly therethrough and then on reaching the second air chamber, that is, at the rear of the partition 22 will be uniformly directed into the tone arm.

I have found that a double air chamber formed by a partition such as that above described serves to clarify and amplify the sound reproduced by such a sound box to such a remarkable extent that the sound waves are coördinated. Interference usually experienced is eliminated. Furthermore, the provision of the double sound box amplifies the reproduced sounds, to a pleasing extent and the clarity is most marked.

I claim:—

1. In a sound box in combination, an imperforate partition mounted rearwardly of the diaphragm, said partition being substantially dished, forming axially and radially extending marginal portions, said axially extending portion having apertures therethrough, the shallow part of the central portion being directed toward said diaphragm and, arranged centrally therewith, and means engaging said radial portion for securing said partition in said sound box.

2. A sound box construction including a diaphragm, a dished imperforate partition wall between said diaphragm and the back of said sound box forming two sound chambers in said box of increasing volume in the direction of flow of the sound waves, said partition being provided with an apertured axially extending marginal portion through which the sound waves are directed into the second sound chamber.

3. A sound box construction including a diaphragm, a dished partition member between the diaphragm and the back of the box defining two air chambers of increasing volume in the direction of flow of the sound waves between the diaphragm and the tone arm connector, said partition provided with an axially extending marginal portion having apertures therethrough, and a radially extending portion for mounting said partition in said sound box.

Signed at Chicago, Illinois, this 2nd day of February, A. D. 1918.

FOREST CHENEY.